O. E. McMURRAY.
STOP-VALVE.

No. 177,346. Patented May 16, 1876.

WITNESSES:
H. Richardson
Geo C Peachout

INVENTOR:
Oscar E. McMurray

UNITED STATES PATENT OFFICE.

OSCAR E. McMURRAY, OF LANSINGBURG, NEW YORK.

IMPROVEMENT IN STOP-VALVES.

Specification forming part of Letters Patent No. 177,346, dated May 16, 1876; application filed April 13, 1875.

*To all whom it may concern:*

Be it known that I, OSCAR E. McMURRAY, of Lansingburg, in the county of Rensselaer and State of New York, have invented certain new and useful Improvements in Stop-Valves; and I do hereby declare the following to be a full, clear, and exact description of the invention, such as will enable others skilled in the art to which it pertains to make and use it, reference being had to the accompanying drawings, which form part of this specification.

The object of my invention is to form a new and improved valve, in which the valve-gates are lowered into position opposite their seats without any pressure being applied, when they are then shut and held tightly against the seats, as shown and described.

Figure 1:
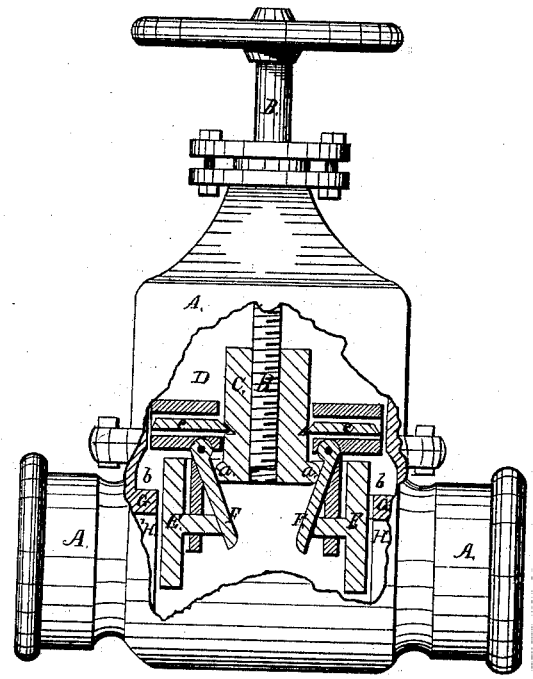
Figure 2:
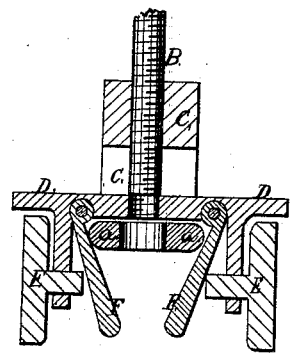
Figure 3:
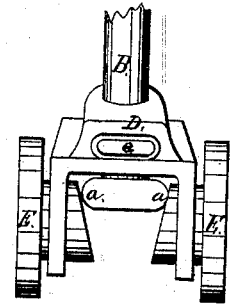

In the annexed drawings, Figure 1 represents a stop-valve, with a portion of the case or shell A broken away to show the working parts. B is the valve stem or screw, on which is the nut C, which has lugs $a$ at the bottom on each side. D is a yoke or collar hanging loosely on the nut C, the lugs $a$ keeping it from dropping off, and to which yoke D the valve-gates E E are hung. F F are levers hanging from the yoke or collar D, and bearing against the backs of the gates. G is a projection on the interior of the case on each side, about opposite or above the center of the valve-seats and under the recesses $b$. H H are the valve-seats. $e$ $e$ are lock-bars, which pass into a recess on each side of the nut C, just above the lugs $a$ $a$. Fig. 2 is a sectional view of another form, in which a thread is formed in the yoke D, which rises and falls on the stem, and releases at the proper place by the stem running out of the thread, as shown. Other plans may be used for locking the nut and yoke; but I prefer the ones shown, as they are both simple and effective.

The operation of the device is as follows, (supposing the valve open:) By rotating the stem B the nut C is lowered, also the yoke D, which is locked to the nut by the bars $e$ $e$, until the gates E E arrive opposite the seats H H, when, the yoke resting on the lugs G G. it can go no farther, the nut, still moving, forces the lock-bars $e$ $e$ back and into the recesses $b$ $b$ in the sides of the case A, allowing the nut to pass through the yoke, forcing the inclined levers F F against the centers of the gates, forcing them squarely against the seats H H, and holding them securely. In opening, the nut rises, relieving the pressure on the levers and gates before raising the yoke with gates attached. The lock-bars $e$ $e$ are forced out of the recesses $b$ $b$ of the case and into the recesses of the nut, as shown.

By this arrangement it will be seen that the gates are free and independent in action, free from friction against the seats, and, when open, are lifted, and leave an unobstructed passage through the valve.

I claim no particular form of nut, yoke, or gate, but the use of the yoke to sustain the gates while being forced against the seats, as shown.

Having thus fully described my invention, what I claim as new, and desire to secure by Letters Patent, is the following claim:

In stop-valves, the movable yoke or support D, with one or more valves, E', supported thereby, in combination with the stem B and nut C, operating substantially as shown and described, and for the purpose as set forth.

In testimony that I claim the foregoing I have hereunto set my hand and seal this 10th day of April, 1875.

OSCAR E. McMURRAY. [L. S.]

Witnesses:
D. C. SIPPELL,
C. W. ANTHONY.